(12) United States Patent
He et al.

(10) Patent No.: US 12,548,248 B2
(45) Date of Patent: Feb. 10, 2026

(54) LATE-TO-EARLY TEMPORAL FUSION FOR POINT CLOUDS

(71) Applicant: Waymo LLC, Mountain View, CA (US)

(72) Inventors: Tong He, Sunnyvale, CA (US); Pei Sun, Palo Alto, CA (US); Zhaoqi Leng, Milpitas, CA (US); Chenxi Liu, Santa Clara, CA (US); Mingxing Tan, Newark, CA (US)

(73) Assignee: Waymo LLC, Mountain View, CA (US)

( * ) Notice: Subject to any disclaimer, the term of this patent is extended or adjusted under 35 U.S.C. 154(b) by 153 days.

(21) Appl. No.: 18/511,566

(22) Filed: Nov. 16, 2023

(65) Prior Publication Data

US 2024/0161398 A1    May 16, 2024

Related U.S. Application Data

(60) Provisional application No. 63/425,999, filed on Nov. 16, 2022.

(51) Int. Cl.

| | |
|---|---|
| *G06T 7/00* | (2017.01) |
| *G01S 17/89* | (2020.01) |
| *G06T 7/194* | (2017.01) |
| *G06T 7/20* | (2017.01) |
| *G06T 17/00* | (2006.01) |
| *G06V 10/44* | (2022.01) |
| *G06V 10/82* | (2022.01) |

(52) U.S. Cl.
CPC .............. *G06T 17/00* (2013.01); *G01S 17/89* (2013.01); *G06T 7/194* (2017.01); *G06T 7/20* (2013.01); *G06V 10/44* (2022.01); *G06V 10/82* (2022.01); *G06T 2207/30241* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 10,984,290 B1 * | 4/2021 | Goel | G06T 7/251 |
| 11,604,272 B2 * | 3/2023 | Su | G01S 13/89 |

(Continued)

OTHER PUBLICATIONS

Chai et al., "To the point: Efficient 3d object detection in the range image with graph convolution kernels," Proceedings of the IEEE/CVF Conference on Computer Vision and Pattern Recognition (CVPR), 2021, pp. 16000-16009.

(Continued)

*Primary Examiner* — Martin Mushambo
(74) *Attorney, Agent, or Firm* — Fish & Richardson P.C.

(57) ABSTRACT

Methods, systems, and apparatus, including computer programs encoded on computer storage media, for generating an output that characterizes a scene at a current time step. In one aspect, one of the systems include: a voxel neural network that generates a current early-stage feature representation of the current point cloud, a fusion subsystem that generates a current fused feature representation at the current time step; a backbone neural network that generates a current late-stage feature representation at the current time step, and an output neural network that generate an output that characterizes a scene at the current time step.

20 Claims, 4 Drawing Sheets

(56) References Cited

U.S. PATENT DOCUMENTS

| | | | |
|---|---|---|---|
| 2018/0315154 A1* | 11/2018 | Park | G06V 10/50 |
| 2020/0025873 A1* | 1/2020 | Kubertschak | G01S 17/931 |
| 2020/0250468 A1* | 8/2020 | Kim | G01S 13/931 |
| 2021/0276595 A1* | 9/2021 | Casas | G06V 30/19173 |
| 2021/0405638 A1* | 12/2021 | Boyraz | G06V 20/64 |
| 2021/0406560 A1* | 12/2021 | Park | G01S 13/862 |
| 2022/0026568 A1* | 1/2022 | Meuter | G01S 7/41 |
| 2022/0398851 A1* | 12/2022 | Nehmadi | G01S 17/931 |
| 2023/0004805 A1* | 1/2023 | Tawari | G06V 10/25 |
| 2023/0027212 A1* | 1/2023 | Goeddel | B60W 60/00276 |
| 2023/0109909 A1* | 4/2023 | Meng | G01S 13/931 342/54 |
| 2023/0281961 A1* | 9/2023 | Fazlali | G06V 20/56 382/103 |

OTHER PUBLICATIONS

Chen et al., "MPPNet: Multi-frame feature intertwining with proxy points for 3D temporal object detection," CoRR, May 12, 2022, arXiv:2205.05979, 17 pages.

Fan et al., "Embracing single stride 3D object detector with sparse transformer," Proceedings of the IEEE/CVF Conference on Computer Vision and Pattern Recognition (CVPR), 2022, pp. 8458-8468.

Fan et al., "RangeDet: In defense of range view for LiDAR-based 3d object detection," Proceedings of the IEEE/CVF International Conference on Computer Vision (ICCV), 2021, pp. 2918-2927.

Huang et al., "An LSTM approach to temporal 3D object detection in LiDAR point clouds," Computer Vision—ECCV, Dec. 4, 2020, pp. 266-282.

Lang et al., "Pointpillars: Fast encoders for object detection from point clouds," Proceedings of the IEEE/CVF Conference on Computer Vision and Pattern Recognition (CVPR), 2019, pp. 12697-12705.

Li et al., "Bevformer: Learning bird's-eye-view representation from multi-camera images via spatiotemporal transformers," CoRR, Mar. 31, 2022, arxiv.org/abs/2203.17270, 20 pages.

Liu et al., "Swin transformer: Hierarchical vision transformer using shifted windows," CoRR, Mar. 25, 2021, arxiv.org/abs/2103.14030, 14 pages.

Loshchilov et al., "Decoupled weight decay regularization," CoRR, Nov. 14, 2017, arXiv:1711.05101, 19 pages.

Meyer et al., "Lasernet: An efficient probabilistic 3D object detector for autonomous driving," Proceedings of the IEEE/CVF Conference on Computer Vision and Pattern Recognition (CVPR), 2019, pp. 12677-12686.

Ngiam et al., "StarNet: Targeted Computation for Object Detection in Point Clouds," CoRR, Aug. 29, 2019, arxiv.org/abs/1908.11069, 12 pages.

Qi et al., "Frustum pointnets for 3d object detection from RGB-D data," Proceedings of the IEEE Conference on Computer Vision and Pattern Recognition (CVPR), 2018, pp. 918-927.

Qi et al., "PointNet: Deep learning on point sets for 3D classification and segmentation," Proceedings of the IEEE Conference on Computer Vision and Pattern Recognition (CVPR), 2017, pp. 652-660.

Qi et al., "Pointnet++: Deep hierarchical feature learning on point sets in a metric space," Advances in Neural Information Processing Systems 30 (NIPS), 2017, 10 pages.

Shi et al., "PointRCNN: 3D object proposal generation and detection from point cloud," Proceedings of the IEEE/CVF Conference on Computer Vision and Pattern Recognition (CVPR), 2019, pp. 770-779.

Shi et al., "PV-RCNN: Pointvoxel feature set abstraction for 3D object detection," Proceedings of the IEEE/CVF Conference on Computer Vision and Pattern Recognition (CVPR), 2020, pp. 10529-10538.

Shi et al., "PV-RCNN++: Point-voxel feature set abstraction with local vector representation for 3d object detection," CoRR, Jan. 31, 2021, arxiv.org/abs/2102.00463, 19 pages.

Sun et al., "RSN: Range sparse net for efficient, accurate lidar 3D object detection," Proceedings of the IEEE/CVF Conference on Computer Vision and Pattern Recognition (CVPR), 2021, pp. 5725-5734.

Sun et al., "Scalability in perception for autonomous driving: Waymo open dataset," Proceedings of the IEEE/CVF Conference on Computer Vision and Pattern Recognition (CVPR), 2020, pp. 2446-2454.

Sun et al., "SWFormer: Sparse window transformer for 3D object detection in point clouds," Computer Vision—ECCV 2022, Nov. 3, 2022, 23 pages.

Yan et al., "Second: Sparsely embedded convolutional detection," Sensors, Oct. 6, 2018, 18(10):3337.

Yang et al., "3D-man: 3D multi-frame attention network for object detection," Proceedings of the IEEE/CVF Conference on Computer Vision and Pattern Recognition (CVPR), 2021, pp. 1863-1872.

Yin et al., "Centerbased 3D object detection and tracking," Proceedings of the IEEE/CVF Conference on Computer Vision and Pattern Recognition (CVPR), 2021, pp. 11784-11793.

Zhou et al., "Objects as points," CoRR, Apr. 14, 2019, arxiv.org/abs/1904.07850, 12 pages.

Zhou et al., "Voxelnet: End-to-end learning for point cloud based 3d object detection," Proceedings of the IEEE Conference on Computer Vision and Pattern Recognition (CVPR), 2018, pp. 4490-4499.

* cited by examiner

LATE-TO-EARLY TEMPORAL FUSION FOR POINT CLOUDS

CROSS-REFERENCE TO RELATED APPLICATION

This application claims priority to U.S. Provisional Application Ser. No. 63/425,999, filed on Nov. 16, 2022. The disclosure of the prior application is considered part of and is incorporated by reference in the disclosure of this application.

BACKGROUND

This specification relates to processing sensor data using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

BRIEF DESCRIPTION OF THE DRAWINGS

Like reference numbers and designations in the various drawings indicate like elements.

DETAILED DESCRIPTION

Figure 1:
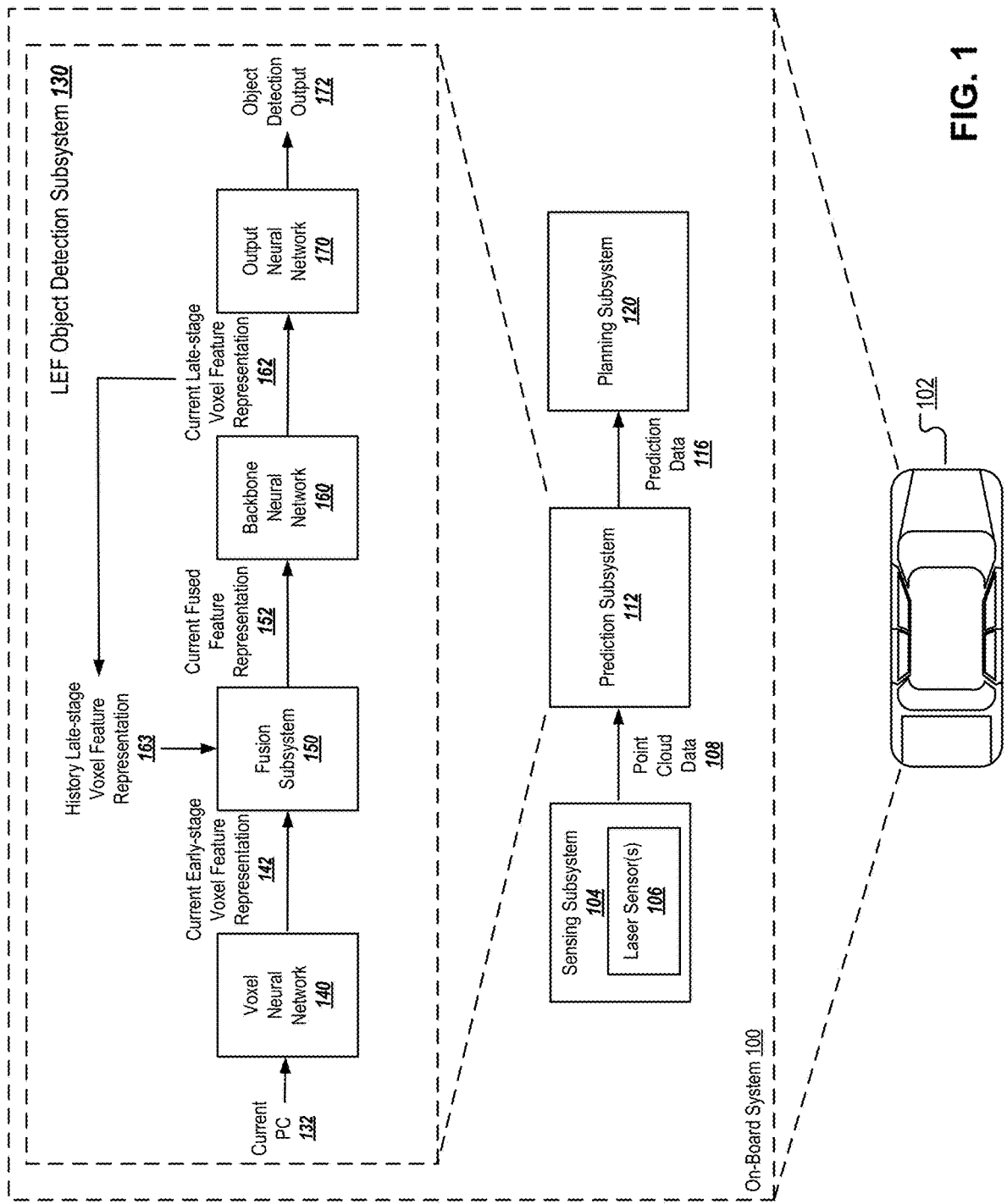
FIG. 1 is a block diagram of an example on-board system.

This specification describes a system implemented as computer programs on one or more computers in one or more locations that processes, using neural networks, point cloud data representing a sensor measurement of a scene captured by one or more sensors to generate an output that characterizes the scene, e.g., an object detection output that identifies locations of one or more objects in the scene or a different kind of output that characterizes different properties of objects in the scene, e.g., the motion characteristics of the objects.

For example, the one or more sensors can be LiDAR sensors of an autonomous vehicle, e.g., a land, air, or sea vehicle, and the scene can be a scene that is in the vicinity of the autonomous vehicle. For example, the objects can include vehicles, pedestrians, cyclists, and so on included in the scene. The output can then be used to make autonomous driving decisions, e.g., e.g., motion planning decisions, for the vehicle, to display information to operators or passengers of the vehicle, or both.

Various techniques have been developed for processing sensor data, including point cloud data generated by LiDAR sensors, that measures an environment to generate outputs that characterize the environment. To generate such outputs from a temporal sequence of sensor data collected over multiple time steps, some early-to-early fusion techniques fuse sensor data directly, i.e., before post-processing, into one or more fused signals which are then used to compute the output, e.g., as one single output for all time steps, while some late-to-late fusion techniques may first extract feature information from the respective sensor data collected at a given time step, i.e., independently from previous time steps, and then combine the extracted feature information for the given time step with the information for one or more previous time steps to compute the output for the given time step.

Unlike any of these early-to-early and late-to-late sensor fusion techniques, the late-to-early fusion pipeline as described in this specification combines historical, late-stage feature representations from one or more previous time steps together with an early-stage feature representation at each given time step to improve both the efficiency and accuracy of computation by processing the temporal sequence of sensor data. While many existing techniques require retraining to adapt to a data sequence length different than the length used in their training settings, the described late-to-early fusion pipeline is readily generalizable to variable data sequence lengths during inference for improved performance with no need for additional training.

In particular, by leveraging inverse calibration and alignment techniques to associate features extracted for stationary objects in the environment within each time step and a window-based attention mechanism to associate features extracted for dynamic objects across multiple time steps, the described late-to-early fusion pipeline effectively captures the shapes and poses for any of a variety of objects that may be present in the environment, even including outsized objects (e.g., semi-trailer trucks, railroad cars, and so on) and occluded objects, and thereby improves the accuracy in detecting such objects. Additionally, incorporating foreground segmentation techniques into the late-to-early fusion pipeline allows for discrimination of foreground features from background features and further improves the efficiency of computation by fusing the foreground features and not the background features, thereby reducing the number of features to be fused for each given time step to one-tenth, or less, of all extracted features.

FIG. 1 is a block diagram of an example on-board system 100. The on-board system 100 is physically located on-board a vehicle 102. Being on-board the vehicle 102 means that the on-board system 100 includes components that travel along with the vehicle 102, e.g., power supplies, computing hardware, and sensors. In some cases, the vehicle 102 is an autonomous vehicle. An autonomous vehicle can be a fully autonomous vehicle that determines and executes fully autonomous driving decisions in order to navigate through an environment. An autonomous vehicle can also be a semi-autonomous vehicle that uses predictions to aid a human driver.

For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation.

As a particular example, the vehicle 102 can alert the driver of the vehicle 102 or take an autonomous driving action when an obstacle is detected, when the vehicle departs from a driving lane, or when an object is detected in a blind spot of the human driver. In another example, in response to determining that another agent might interact with the vehicle 102, the vehicle 102 can alert the driver or autonomously apply the brakes of the vehicle 102 or otherwise autonomously change the trajectory of the vehicle 102 to prevent an unwanted interaction between the vehicle 102 and an agent.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be another kind of autonomous vehicle that travels along a roadway, e.g., a truck or a motorcycle. Moreover, the on-board system 100 can include components additional to those depicted in FIG. 1 (e.g., a collision detection system or a navigation system).

To enable the safe control of the autonomous vehicle 102, the on-board system 100 includes a sensor subsystem 104 which enables the on-board system 100 to "see" the environment in the vicinity of the vehicle 102. For example, the environment can be an environment in the vicinity of the vehicle 102 as it drives along a roadway. The term "vicinity," as used in this specification, refers to the area of the environment that is within the sensing range of one or more of the sensors of the vehicle 102. The agents in the vicinity of the vehicle 102 may be, for example, pedestrians, bicyclists, or other vehicles.

The sensor subsystem 104 includes, amongst other types of sensors, one or more laser sensors 106 that are configured to detect reflections of laser light from the environment in the vicinity of the vehicle 102. Examples of a laser sensor 106 include a time-of-flight sensor, a stereo vision sensor, a two-dimensional light detection and ranging (LiDAR) sensor, a three-dimensional LiDAR sensor, and so on.

The sensor subsystem 104 continually (i.e., at each of multiple time points within a given time period) captures raw sensor measurements which can indicate the directions, intensities, and distances travelled by reflected radiation. For example, a laser sensor 106 can transmit one or more pulses of electromagnetic radiation in a particular direction and can measure the intensity of any reflections as well as the time that the reflection was received. A distance can be computed by determining the time which elapses between transmitting a pulse and receiving its reflection. Each laser sensor can continually sweep a particular space in angle, azimuth, or both. Sweeping in angle, for example, can allow the laser sensor to detect multiple objects in an area within the field of view of the laser sensor.

The sensor subsystem 104, or another subsystem such as a data representation subsystem also on-board the vehicle 102, uses the raw sensor measurements (and, optionally, additional data available in data repositories stored within the autonomous vehicle 102, or data repositories outside of, but coupled to, the autonomous vehicle, such as in a data center with the data available made to the autonomous vehicle over a cellular or other wireless network) to generate sensor data that that characterizes the agents and environment in the vicinity of the vehicle 102.

The sensor data includes point cloud data 108. The point cloud data 108 can be generated in any of a variety of ways. In some implementations, the raw laser sensor measurements (e.g., raw LiDAR sensor measurements) can be complied into a point cloud, e.g., a three-dimensional point cloud (e.g., a LiDAR point cloud), with each point having an intensity and a position, and, optionally, other attributes such as color information, second return, or normals. The position can, for example, be represented as either a range and elevation pair, or 3D coordinates (x, y, z), in a coordinate space that is centered around a given location, e.g., the position on which the one or more laser sensors are located, e.g., the autonomous vehicle 102.

Since the raw sensor measurements are continually captured, the point cloud data 108 can be provided as a data stream that includes a temporal sequence of point clouds. The temporal sequence of point clouds includes multiple point clouds, each corresponding to a specific time step (or time window) and including points that represent reflections of pulses of laser light transmitted by the sensor within the specific time step. The length of each time step can, for example, depend on the time required by a laser sensor to perform a full sweep or revolution within its field of view.

The sequence is referred to as a temporal sequence because the point clouds are arranged according to the order in which the corresponding sensor measurements were captured during the given time period, e.g., such that the most recent point cloud (corresponding to the most recent time step) is the last one in the sequence, while the least recent point cloud (corresponding to the least recent time step) is the first one in the sequence. For example, the point cloud data 108 can include a first point cloud that is generated based on raw laser sensor measurements captured during a first time step, a second point cloud that is generated based on raw laser sensor measurements captured during a second time step that is subsequent to the first time step, and so on.

The on-board system 100 can provide the sensor data including the point cloud data 108 to a prediction subsystem 112 of the on-board system 100. The on-board system 100 uses the prediction subsystem 112 to continually generate prediction data 116 which predicts certain aspects of some or all of the agents in the vicinity of the vehicle 102. In addition, the on-board system 100 can send the sensor data to one or more data repositories within the vehicle 102, or data repositories outside of the vehicle 102, such as in a data center, over a cellular or other wireless network, where the sensor data is logged.

For example, the prediction data 116 can be or include object detection prediction data that specifies one or more regions in an environment characterized by the point cloud data 108 that are each predicted to depict a respective object. For example, the prediction data 116 can be or include object detection prediction data which defines a plurality of 3-D bounding boxes with reference to the environment characterized by the point cloud data 108 and, for each of the plurality of 3-D bounding boxes, a respective likelihood that an object belonging to an object category from a set of possible object categories is present in the region of the environment circumscribed by the 3-D bounding box. For example, object categories can represent animals, pedestrians, cyclists, or other vehicles within a proximity to the vehicle.

As another example, the prediction data 116 can be or include object classification prediction data which includes scores for each of a set of object categories, with each score representing an estimated likelihood that the point cloud data 108 contains a point cloud of an object belonging to the category. For example, the prediction data 116 can specify that the point cloud data 108 likely includes a blob of points of a nearby car.

As another example, the prediction data 116 can be or include point cloud segmentation prediction data which defines, for each point included in the temporal sequence of point clouds, which of multiple object categories the point belongs to.

As another example, the prediction data 116 can be or include motion detection prediction data which specifies, for each of one or more of objects that are located in the scene, a velocity, an acceleration, a heading, a trajectory, or a combination thereof of the object.

The on-board system 100 can provide the prediction data 116 generated by the prediction subsystem 112 to a planning subsystem 120.

When the planning subsystem 120 receives the prediction data 116, the planning subsystem 120 can use the prediction data 116 to generate planning decisions which plan the future motion of the vehicle 102. The planning decisions generated by the planning subsystem 120 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning subsystem 120 with trajectory prediction data indicating that the future trajectory of another vehicle is likely to cross the future trajectory of the vehicle 102, potentially resulting in a collision. In this example, the planning subsystem 120 can generate a planning decision to apply the brakes of the vehicle 102 to avoid a collision.

The planning decisions generated by the planning subsystem 120 can be provided to a control subsystem of the vehicle 102. The control subsystem of the vehicle can control some or all of the operations of the vehicle by implementing the planning decisions generated by the planning subsystem. For example, in response to receiving a planning decision to apply the brakes of the vehicle, the control subsystem of the vehicle 102 may transmit an electronic signal to a braking control unit of the vehicle. In response to receiving the electronic signal, the braking control unit can mechanically apply the brakes of the vehicle.

In addition or alternatively, the on-board system 100 can provide the prediction data 116 generated by the prediction subsystem 112 to a user interface subsystem. When the user interface subsystem receives the prediction data 116, the user interface subsystem can use the prediction data 116 to present information to the driver of the vehicle 102 to assist the driver in operating the vehicle 102 safely. The user interface subsystem can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102).

To generate the various prediction data 116 from the sensor data, the prediction subsystem 112 implements trained neural networks that are each configured to process inputs derived from the sensor data in accordance with trained parameters of the neural network to generate respective outputs that are included in the prediction data 116. A neural network is said to be "trained" if the parameter values of the neural network have been adjusted, i.e., by applying a training procedure to a training set of inputs, to improve the performance of the neural network on its prediction task. In other words, a trained neural network generates an output based solely on being trained on training data rather than on human-programmed decisions. For convenience, the neural networks as used in throughout this description will generally refer to trained ones.

As illustrated in FIG. 1, to generate the output that characterizes the scene in an accurate and efficient manner, the prediction subsystem 112 implements a late-to-early temporal fusion (LEF) object detection subsystem 130. The LEF object detection subsystem 130 implements a late-to-early fusion pipeline to process the temporal sequence of point cloud data 108 and then computes the 3-D object detection output from the late-to-early fused sensor data.

By fusing object-aware latent embeddings into the early stages of a 3-D object detection backbone, this fusion pipeline enables the LEF object detection subsystem 130 to better capture the shapes and poses for any of a variety of objects, including large vehicles such as class 8 trucks (e.g., trucks, tractor-trailer units, recreational vehicles, buses, or tall work vans), e.g., relative to some existing object detection systems that detects objects from raw point clouds.

To implement the late-to-early fusion pipeline, the LEF object detection subsystem 130 includes a voxel neural network 140, a fusion subsystem 150, a backbone neural network 160, and an output neural network 170.

At each time step in the sequence of time steps, the voxel neural network 140 receives a current point cloud, e.g., the current point cloud 132, that corresponds to the time step, and processes the current point cloud to generate a current early-stage voxel feature representation, e.g., the current early-stage voxel feature representation 142, that corresponds to the current point cloud data at the time step.

At each time step in the sequence of time steps, the fusion subsystem 150 receives the current early-stage voxel feature representation, e.g., the current early-stage voxel feature representation 142, and also receives a historical late-stage voxel feature representation, e.g., the historical late-stage voxel feature representation 163, that corresponds to a preceding time step that precedes the current time step in the sequence of time steps.

The fusion subsystem 150 processes the current early-stage voxel feature representation and the historical late-stage voxel feature representation to generate a current fused feature representation, e.g., the current fused feature representation 152, at the current time step.

At each time step in the sequence of time steps, the backbone neural network 160 receives the current fused feature representation, e.g., the current fused feature representation 152, and processes the current fused feature representation to generate a current late-stage voxel feature representation, e.g., the current late-stage voxel feature representation 162, that corresponds to the time step.

At each time step in a sequence of time steps, the output neural network 170 receives the current late-stage voxel feature representation, e.g., the current late-stage voxel feature representation 162, and processes the current late-stage voxel feature representation to generate an object detection output 172. The object detection output 172 includes data that specifies one or more regions in an environment characterized by the current point cloud corresponding to the time step that are each predicted to depict a respective object.

In this specification, "current" data (e.g., current point cloud data) and "historical" data (e.g., historical point cloud data) differ in the time steps at which the data is processed, e.g., received or generated, by a neural network which recurrently processes data at different time steps. At any given time step in a sequence of time steps, current data may be data that is processed by the neural network at exactly the given time step, while historical data may include data that is processed by the neural network at one or more previous time steps that precede the given time step.

In this specification, "early-stage" data (e.g., early-stage voxel feature representation) and "late-stage" data (e.g., late-stage voxel feature representation) differ in the number of neural network layers through which the data has been passed within a neural network having multiple layers. In other words, despite being derived from input data that is (at least partially) identical to one another, late-stage data typically undergoes an extra amount of transformation (or other processing, by virtue of getting passed through a greater number of layers) compared with early-stage data.

In the example of a neural network having an input layer which receives an input to the neural network, an output layer which generates an output of the neural network, and a stack of one or more intermediate layers arranged between the input and output layers, the early-stage data may refer to data generated by the input layer (from processing the received input) or by one or more of the intermediate layers, while the late-stage data may refer to data generated by the last layer of the one or more intermediate layers (from processing the early-stage data and, optionally, the received input) or another intermediate layer that is after the layer that generated the early-stage data within the neural network.

Figure 2:
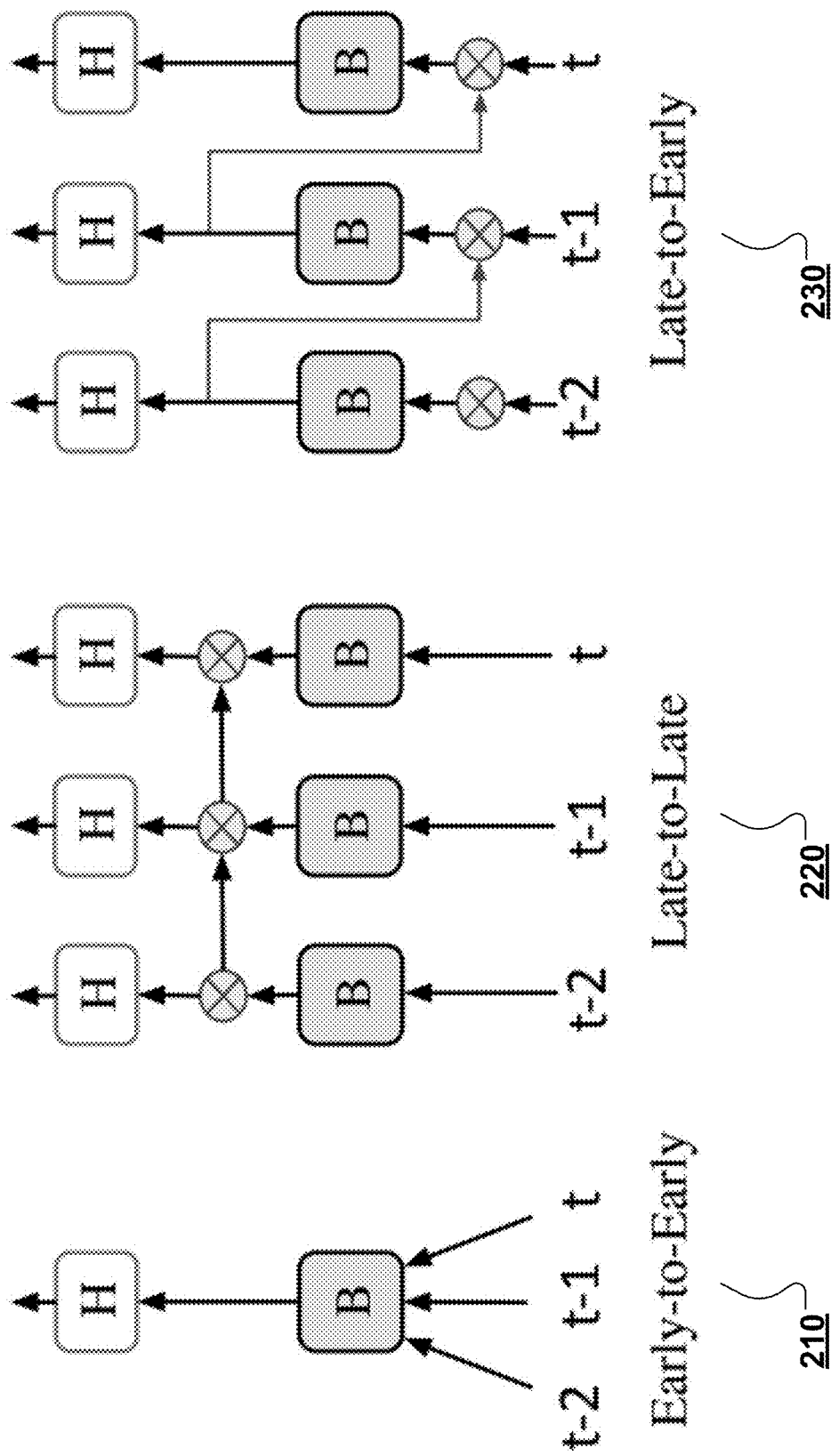
FIG. 2 is an example illustration of a comparison between different temporal fusion pipelines.

FIG. 2 is an example illustration of a comparison between different temporal fusion pipelines: an early-to-early temporal fusion pipeline 210, a late-to-late temporal fusion pipeline 220, and a late-to-early temporal fusion pipeline 230.

These pipelines can be applied to a neural network having any appropriate architecture that includes multiple layers. The neural network can include a backbone (B), which includes a first subset of the multiple layers, and a prediction head (H), which includes a second subset of the multiple layers.

The early-to-early temporal fusion pipeline 210 is implemented based on point cloud stacking to improve model performance, e.g., object detection accuracy, relative to processing a single point cloud. A representative example of the early-to-early temporal fusion pipeline 210 is the PV-RCNN pipeline (described in S. Shi, et al., "Pvrcnn: Point-voxel feature set abstraction for 3d object detection," in CVPR, 2020, pp. 10 529-10 538), which relies on early-to-early fusion with point cloud stacking.

In the early-to-early temporal fusion pipeline 210, different point clouds corresponding respectively to a sequence of multiple time steps, e.g., time step t−2, t−1, and t, are stacked together to generate the model input. The neural network processes the model input, which includes the stack of different point clouds, using the backbone and the prediction head to generate an object detection output.

However, in the early-to-early temporal fusion pipeline 210, the model performance might saturate as a larger number of point clouds are simply stacked together, e.g., without modeling of the inter-point cloud relationships. Moreover, each point cloud needs to be repeatedly processed when they are stacked into different adjacent point clouds, greatly increasing computation cost. Fitting long sequences of point clouds will also greatly increase memory cost, reduce model efficiency or even result in out of memory (OOM) issues.

The late-to-late temporal fusion pipeline 220 is another type of temporal fusion pipeline that overcomes some of these issues by utilizing learned historical embeddings. A representative example of the late-to-late temporal fusion pipeline 220 is the ConvLSTM pipeline (described in R. Huang, et al., "An lstm approach to temporal 3d object detection in lidar point clouds," in ECCV, 2020, pp. 266-282) which recurrently fuses latent embeddings between consecutive point clouds at deep layers of the neural network.

In the late-to-late temporal fusion pipeline 220, the neural network processes a point cloud corresponding to a current time step, e.g., time step t, using the backbone to generate a current latent embedding. The neural network then provides the current latent embedding together with a historical latent embedding, which has been generated by the backbone from a point cloud corresponding to a historical time step, e.g., time step t−1, to the prediction head, and processes both the current latent embedding and the historical latent embedding using the prediction head to generate an output detection output at the current time step.

The late-to-late temporal fusion pipeline 220 may result in reduced memory usage and computation cost, but may also result in inferior model performance relative to early-to-early temporal fusion pipeline 210.

Unlike the early-to-early temporal fusion pipeline 210 and late-to-late temporal fusion pipeline 220, the late-to-early temporal fusion pipeline 230 combines a historical, late-stage latent embedding from one or more previous time steps together with an early-stage latent embedding at the current time step.

In the late-to-early temporal fusion pipeline 230, the neural network processes both (i) a point cloud corresponding to a current time step, e.g., time step t, and (ii) a historical latent embedding, which has been generated by the backbone from a point cloud corresponding to a historical time step, e.g., time step t−1, using the backbone to generate a current latent embedding. The neural network then provides the current latent embedding using the prediction head to generate an output detection output at the current time step.

In particular, this late-to-early temporal fusion pipeline 230 corresponds to the sensor fusion pipeline used by the LEF object detection subsystem 130 of FIG. 1, where the voxel neural network 140 and the backbone neural network 160 in FIG. 1 correspond collectively to the backbone B in FIG. 2, and the output neural network 170 in FIG. 1 corresponds to the prediction head H in FIG. 2.

Figure 3:
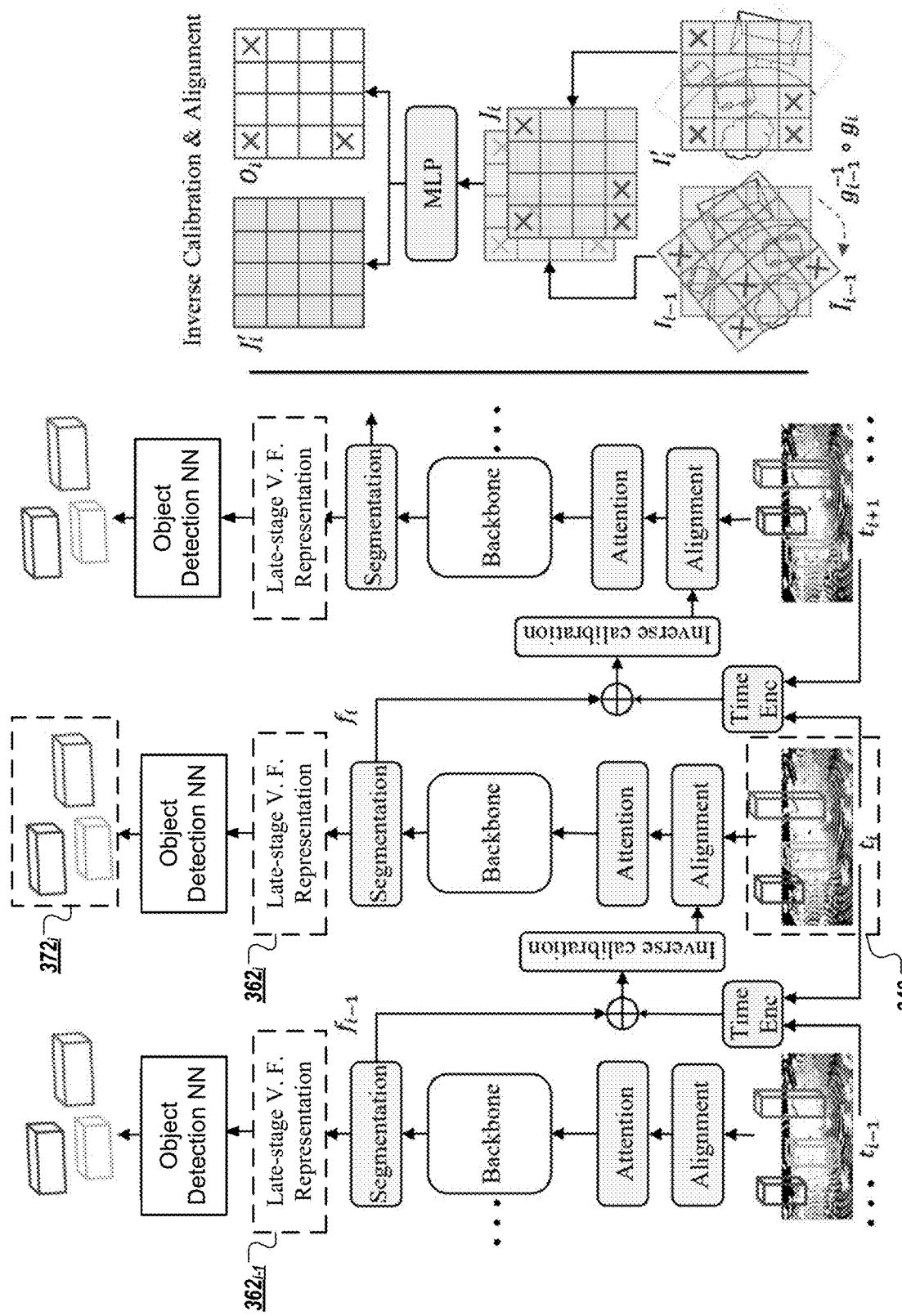
FIG. 3 is an example illustration of operations performed by an object detection subsystem that implements a late-to-early temporal fusion pipeline.

FIG. 3 is an example illustration of operations performed by an object detection subsystem that uses a late-to-early temporal fusion pipeline. The object detection subsystem includes a fusion subsystem, a voxel neural network, a backbone neural network, and an output neural network.

The voxel neural network receives, as input, a point cloud corresponding to the current time step $t_i$, and process the input to generate, as output, a current early-stage voxel feature representation $342_i$ corresponding to the current time step $t_i$. The current point cloud includes a collection of points that are generated based on raw laser sensor measurements captured during the current time step $t_i$.

The voxel neural network generates the current early-stage voxel feature representation $342_i$ based on voxelizing the points included in the current point cloud into a set of voxels, and then generating a respective representation of each of the set of voxels. That is, the voxel neural network assigns each point in the current point cloud data to a respective voxel in the set of voxels, and processes, for each voxel, the points assigned to the voxel to generate a respective voxel feature representation of the points assigned to the voxel.

In some implementations, the respective voxel feature representations are combined and then used as the current early-stage voxel feature representation $342_i$ for the current time step $t_i$. In other implementations, the voxel neural network applies one or more additional layers to the respective voxel feature representations to generate the current early-stage voxel feature representation $342_i$ for the current time step $t_i$.

The voxelization can be any voxelization, e.g., a pillar-style voxelization or a 3-D voxelization or another type of voxelization, and the voxel neural network can have any appropriate architecture that allows the voxel neural network to perform the voxelization. For example, the voxel neural network can have a convolutional neural network architecture, e.g., the architecture described in Y. Zhou, et al., "Voxelnet: End-to-end learning for point cloud based 3d object detection," in CVPR, 2018, pp. 4490-4499. As another example, the voxel neural network can have a different architecture, e.g., an attention neural network architecture.

The fusion subsystem fuses (i) the current early-stage voxel feature representation $342_i$ at the current time step $t_i$ and (ii) a historical late-stage voxel feature representation $362_{i-1}$ at a preceding time step $t_{i-1}$ to generate a current fused feature representation for the current time step $t_{i-1}$. As will be described later, the backbone neural network generated the historical late-stage voxel feature representation $362_{i-1}$ at the preceding time step $t_{i-1}$. For example, at the current time step $t_i$, the operations performed by the fusion subsystem to generate the current fused feature representation can be defined as:

$$f_i = \psi(h(f_{i-1} \oplus \tau(t_i - t_{i-1}), \nu(\{X_{i,j}\}))),$$

where $f_{i-1}$ is the historical late-stage voxel feature representation for the preceding time step $t_{i-1}$, $\tau(\bullet)$ is a sinusoidal function for encoding a time step offset (an offset of the current time step $t_i$ relative to the preceding time step $t_{i-1}$), $\nu(\bullet)$ represents the voxel neural network, $X_{i,j} \in \mathbb{R}^3$ is the collection of points included in the current point cloud data, $h(\bullet)$ represents the backbone neural network, and $\psi(\bullet)$ is a foreground segmentation layer.

Thus, in this example, the fusion subsystem receives a sinusoidal time step offset encoding, processes (i) the current early-stage voxel feature representation, (ii) the historical late-stage voxel feature representation, and (iii) the sinusoidal timestamp offset encoding to generate the current fused feature representation at the current time step. In other examples, however, the fusion subsystem can use a different type of time step offset encoding, or no time step offset encoding at all.

As illustrated in FIG. 3, the fusion subsystem includes an inverse calibration and alignment engine, and an attention fusion neural network. At a high level, the inverse calibration and alignment engine applies an inverse calibration and alignment process to match the feature representations of the voxels that include points of stationary objects, while the attention fusion neural network applies window-based attention to associate voxels that include points of dynamic objects.

While images might be naturally aligned across different time steps by their dimensions (e.g., height, width, and/or number of channels), the voxel feature representations could be sparse, and could be neither aligned nor with the same cardinality. The fusion subsystem thus uses the inverse calibration and alignment engine to alleviate this misalignment issue by applying an inverse transformation process.

More specifically, the inverse calibration and alignment engine computes an inverse of a spatial transformation matrix and then transforms, by using the inverse of the spatial transformation matrix, the historical late-stage voxel feature representation to generate an inversely calibrated historical late-stage voxel feature representation.

The spatial transformation matrix defines a mapping from (i) a coordinate space of the LiDAR sensor at the preceding time step $t_{i-1}$, to (ii) a predetermined coordinate space of the scene at the preceding time step $t_{i-1}$. For example, the coordinate space of the LiDAR sensor can be a coordinate space that is centered around position on which the LiDAR sensor is located on the vehicle, and the predetermined coordinate space of the scene can be a coordinate space of a calibrated bird's eye view (BEV) map of the scene.

The forward calibration process can be defined as:

$$I_{i-1} \cdot g_{i-1}^{-1} \cdot g_i \mapsto \tilde{I}_{i-1},$$

where $g_{i-1} \in \mathbb{R}^{4 \times 4}$ is the spatial transformation matrix at the preceding time step $t_{i-1}$ (where the -1 sign in the superscript represents the inverse of the spatial transformation matrix), $g_i$ is the spatial transformation matrix at the current time step $rt_i$, $\bullet$ represents applying vehicle coordinate space transformation, and $I_{i-1}$ and $\tilde{I}_{i-1}$ represent the initial BEV map and the calibrated BEV map, respectively, where $I_{i-1} \in \mathbb{R}^{H \times W \times d}$.

The inverse calibration process is the reverse of this forward calibration process. When applied on the historical late-stage voxel feature representation, the inverse calibration process thus maps the historical late-stage voxel feature representation to the coordinate space of the calibrated BEV map $\tilde{I}_{i-1}$ and then to the coordinate space of the initial BEV map $I_{i-1}$. The mapped historical late-stage voxel feature representation will be used as the inversely calibrated historical late-stage voxel feature representation.

In some implementations, to generate the inversely calibrated historical late-stage voxel feature representation, the inverse calibration and alignment engine can use zero padding at coordinates that have empty or out-of-view voxel feature representations, e.g., as indicated by the cross markers in FIG. 3.

Because the inversely calibrated historical late-stage voxel feature representation is aligned with the current early-stage voxel feature representation, the inverse calibration and alignment engine can then combine the inversely calibrated historical late-stage voxel feature representation and the current early-stage voxel feature representation to generate a current aligned feature representation at the current time step.

In some implementations, the inverse calibration and alignment engine can determine the combination by computing a concatenation along the z-dimension defined as:

$$\tilde{I}_{i-1} \oplus I_i' \mapsto J_i \in \mathbb{R}^{H \times W \times 2d}$$

and then applying dimension reduction, e.g., by applying a multilayer perceptron (MLP) as illustrated in FIG. 3, on the combination $J_i$ to generate a dimension reduced combination $J_i'$, where the z-dimension is reduced from 2d to d.

In some of these implementations, the dimension reduced combination $J_i'$ can then be used as the current aligned feature representation at the current time step.

In others of these implementations, because not all the coordinates within dimension reduced combination $J_i'$ have valid features, the inverse calibration and alignment engine additionally applies a mask $O_i \in \mathbb{R}^{H \times W}$ on the dimension reduced combination $J_i'$ to identify the subset of the coordinates within the dimension reduced combination $J_i'$ that have valid features. For example, the mask can be a union BEV Boolean mask. When used, such a union BEV Boolean mask ensures that data sparsity in the current aligned feature representation is not lost.

The attention fusion neural network receives, as input, the current aligned feature representation and processes the input to generate, as output, the current fused feature representation at the current time step.

In some implementations, the attention fusion neural network includes one or more window-based attention blocks. Each window-based attention block is configured to apply an attention mechanism to each of multiple respective "windows"—where each window corresponds to a subset of the current aligned feature representation (which may be spatially distinct to each other)—to capture relationship among features within the respective window and, optionally, across different windows.

In these implementations, the attention mechanism applied by a window-based attention block can be any attention mechanism, e.g., a self-attention mechanism, a cross-attention mechanism, or a mix-attention mechanism. Generally, an attention mechanism maps a query and a set of key-value pairs to an output, where the query, keys, and values are all vectors derived from an input to the attention mechanism based on respective matrices. The output is computed as a weighted sum of the values, where the weight assigned to each value is computed by a compatibility function e.g. a dot product or scaled dot product, of the query with the corresponding key.

For example, the query vectors can be derived from the current aligned feature representation at the current time step. Self-attention mechanism uses the same key and value vectors as the query vectors. Cross-attention mechanism uses key and value vectors that are derived from the inversely calibrated historical late-stage voxel feature representation. Mix-attention uses key and value vectors that are derived both the current aligned feature representation and the inversely calibrated historical late-stage voxel feature representation.

The backbone neural network receives, as input, the current fused feature representation and process the input to generate, as output, a current late-stage voxel feature representation $362_i$ at the current time step $t_i$. The backbone neural network can generally have any appropriate architecture that allows the backbone neural network to map the current fused feature representation to the current late-stage voxel feature representation $362_i$ at the current time step $t_i$.

To that end, the backbone neural network can include any appropriate types of neural network layers (e.g., fully connected layers, attention layers, convolutional layers, and so forth) in any appropriate number (e.g., 5 layers, or 10 layers, or 100 layers) and connected in any appropriate configuration (e.g., as a directed graph of layers).

As a particular example, the backbone neural network can have the sparse window transformer architecture described in P. Sun, et al., "Swformer: Sparse window transformer for 3d object detection in point clouds," in ECCV, 2022. In this particular example, the backbone neural network includes multiple window-based attention blocks, where each window-based attention block includes multiple attention layers separated by a window shift operation. The window shift operation involves adding offsets that are dependent on window sizes to the coordinates within the current aligned feature representation, and then running a window partition algorithm (e.g., the same algorithm that was used to partition the into respective windows) to re-partition the windows for each attention block.

In the example of FIG. 3, the last layer of the backbone neural network is a foreground segmentation layer. The foreground segmentation layer processes the output of a preceding layer, e.g., the output of the last window-based attention block, to generate, as output, the current late-stage voxel feature representation at the current time step by removing voxel feature representations that have been generated for background points. The background points can include points with the current point cloud that belong to background objects, e.g., stationary objects, in the scene of the environment.

The output neural network receives, as input, the current late-stage voxel feature representation $362_i$ at the current time step $t_i$ and process the input to generate an output 372, that characterizes the scene at the current time step $t_i$.

In the example of FIG. 3, the output neural network is an object detection neural network, and the output is an object detection output that includes data that identifies objects that are located in the scene. As a particular example, the object detection neural network can have the architecture described in T. Yin, et al., "Center-based 3d object detection and tracking," in CVPR, 2021, pp. 11 784-11 793.

For example, the output can include object detection prediction data which defines a plurality of 3-D bounding boxes with reference to the environment characterized by the current point cloud and, for each of the plurality of 3-D bounding boxes, a respective likelihood that an object belonging to an object category from a set of possible object categories is present in the region of the environment circumscribed by the 3-D bounding box. For example, object categories can represent animals, pedestrians, cyclists, or other vehicles within a proximity to the vehicle.

In other examples, the output neural network can be a different neural network, and the output can be another output that includes data characterizing one or more different aspects of the environment.

For example, the output neural network can be an object classification neural network, and the output can include object classification prediction data which includes scores for each of a set of object categories, with each score representing an estimated likelihood that the current point cloud contains a point cloud of an object belonging to the category.

As another example, the output neural network can be a point cloud segmentation neural network, and the output can include point cloud segmentation prediction data which defines, for each point included in the current point cloud, which of multiple object categories mentioned above, or a different set of categories, that the point belongs to.

As yet another example, the output neural network can be a motion detection neural network, and the output can include motion detection prediction data that specifies a velocity, acceleration, heading, trajectory, or a combination thereof of each of the objects that are located in the scene.

In some implementations, the motion detection prediction is an estimation of the past motion (e.g., a past velocity, a past acceleration, a past heading, or past trajectory) of the object before the current time step. In other implementations, the motion detection prediction is an estimation of the future motion (e.g., a future velocity, a future acceleration, a future heading, or a future trajectory) of the object after the current time step.

Figure 4:
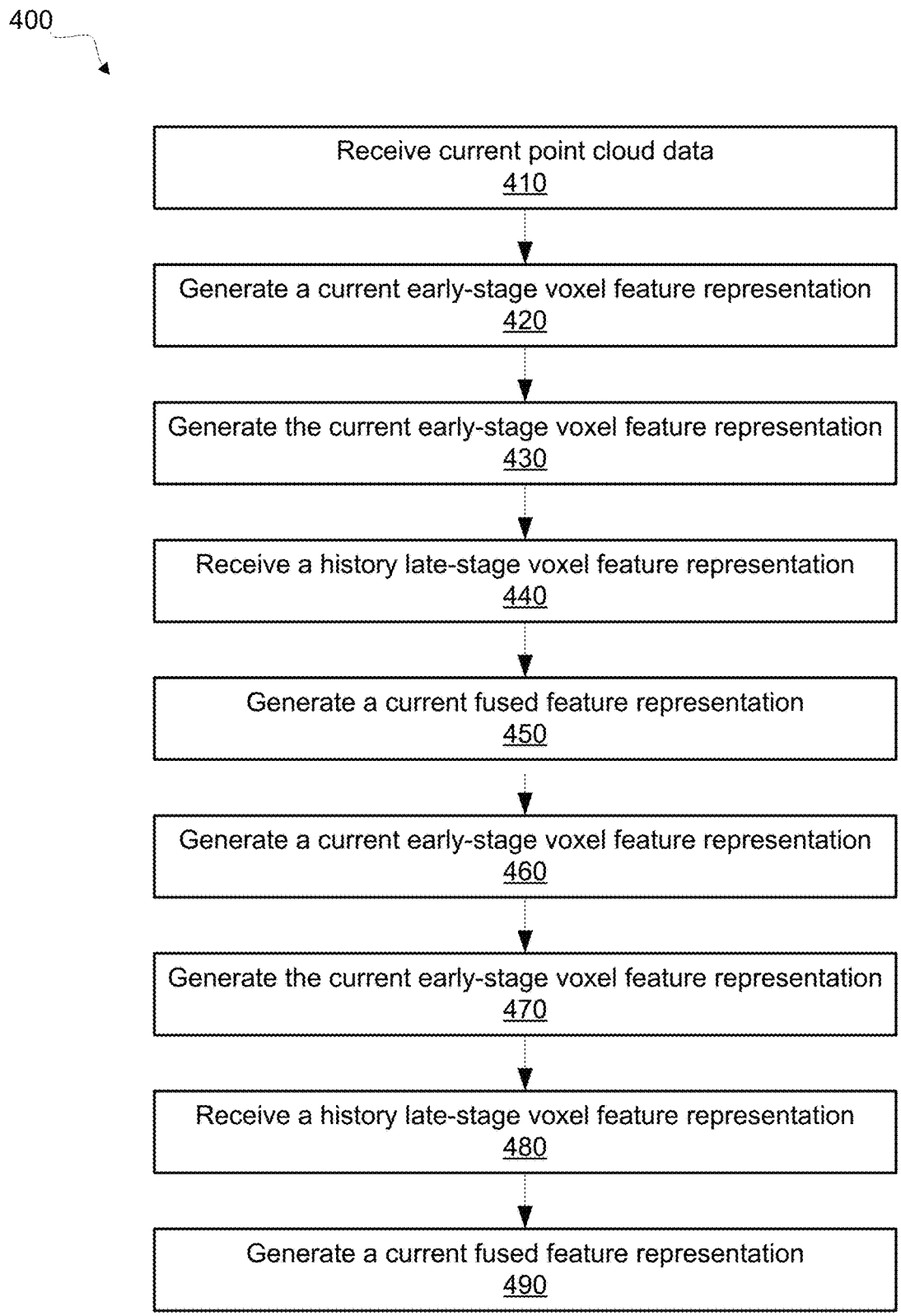
FIG. 4 is a flow diagram of an example process for generating an output that characterizes a scene at a current time step.

FIG. 4 is a flow diagram of an example process 400 for generating an output that characterizes a scene at a current time step. For convenience, the process 400 will be described as being performed by a system of one or more computers located in one or more locations. For example, a system, e.g., the on-board system 100 of FIG. 1, appropriately programmed in accordance with this specification, can perform the process 400.

The system can repeatedly perform the process 400 at each time step (referred to as the "current" time step below) in a sequence of time steps to receive a current point cloud at the time step, and generate an output that characterizes the scene at the current time step.

Thus, by repeatedly performing the process 400, the system can receive a temporal sequence of point cloud data that represents a respective sensor measurement of a scene captured by a LiDAR sensor at each of multiple time steps, and process the temporal sequence of point cloud data to generate an output that characterizes the scene at the each of one or more of the multiple time steps.

As will be elaborated further below, the system generates the output at the current time step based on fusing current early-stage data with historical late-stage data. Compared with the current early-stage data, the historical late-stage data was generated at an earlier time step, and has undergone an extra amount of transformation (or other processing, by virtue of getting passed through a greater number of layers of a neural network).

The system receives, at the voxel neural network, point cloud data that includes the current point cloud at the current time step (step 410). The current point cloud represents a sensor measurement of a scene captured by a LiDAR sensor during the current time step.

In some implementations, the current point cloud is generated from data captured by a LiDAR sensor of an autonomous vehicle in a real-world environment. In other implementations, the current point cloud is generated from data that simulates data that would be captured by a LiDAR sensor of an autonomous vehicle in the real-world environment.

The system processes, using the voxel neural network, the current point cloud to generate a current early-stage voxel feature representation corresponding to the current point cloud at the current time step (step 420). The voxel neural network generates the current early-stage voxel feature representation based on voxelizing the points included in the current point cloud into a set of voxels, and then generating a respective representation of each of the set of voxels.

The system receives, at the fusion subsystem, the current early-stage voxel feature representation corresponding to the current point cloud at the current time step (step 430).

The system receives, at the fusion subsystem, a historical late-stage voxel feature representation corresponding to a historical point cloud at a preceding time step that precedes the current time step in the sequence of time steps (step 440). The historical point cloud represents a sensor measurement of the scene captured by the LiDAR sensor at the preceding time step, and the historical late-stage voxel feature representation was generated by the backbone neural network at the preceding time step.

The system processes, using the fusion subsystem, the current early-stage voxel feature representation and the historical late-stage voxel feature representation to generate a current fused feature representation at the current time step (step 450). That is, the fusion subsystem fuses data generated at two different time steps—the current early-stage voxel feature representation generated at the current time step, and the historical late-stage voxel feature representation generated at the preceding time step—to generate fused data corresponding to the current time step.

In some implementations, the fusion subsystem includes an inverse calibration and alignment engine, and an attention fusion neural network. The inverse calibration and alignment engine applies an inverse calibration and alignment process on the historical late-stage voxel feature representation to generate a current aligned feature representation at the current time step. The attention fusion neural network applies a window-based attention on the current aligned feature representation to generate the current fused feature representation at the current time step.

The system receives, at the backbone neural network, the current fused feature representation corresponding to the current time step (step 460).

The system processes, using the backbone neural network, the current fused feature representation to generate a current late-stage voxel feature representation at the current time step (step 470). The backbone neural network can include any appropriate types of neural network layers in any appropriate number and connected in any appropriate configuration.

The system receives, at the output neural network, the current late-stage voxel feature representation at the current time step (step 480).

The system processes, using the output neural network, the current late-stage voxel feature representation to generate an output that characterizes the scene at the current time step (step 490).

For example, the output neural network can be an object detection neural network, and the output can include object detection data that identifies objects that are located in the scene.

As another example, the output neural network can be an object classification neural network, and the output can include object classification data which includes scores for each of a set of object categories, with each score representing an estimated likelihood that the current point cloud contains a point cloud of an object belonging to the category.

As another example, the output neural network can be a point cloud segmentation neural network, and the output can include point cloud segmentation data which defines, for each point included in the current point cloud, which of multiple object categories the point belongs to.

As yet another example, the output neural network can be a motion detection neural network, and the output can include motion detection data that specifies a velocity, acceleration, heading, trajectory, or a combination thereof of each of the objects that are located in the scene.

In some implementations, the output is generated on-board the autonomous vehicle. In these implementations, the system can then provide the output, data derived from the output, or both to an on-board system of the autonomous vehicle for use in controlling the autonomous vehicle.

In some other examples, the system can provide output, data derived from the output, or both for use in controlling the simulated autonomous vehicle in the computer simulation.

The process 400 can be performed as part of predicting an output for an input for which the desired output, i.e., the output that should be generated by the system for a point cloud, is not known.

The process 400 can also be performed as part of processing inputs derived from a set of training data, i.e., inputs derived from a set of point cloud data for which the output that should be generated by the system is known, in order to train the trainable components of the system—including the voxel neural network, the fusion subsystem, the backbone neural network, and the output neural network—to determine trained values for the parameters of these neural networks.

The system can repeatedly perform the process 400 on training inputs selected from a set of training data as part of a conventional machine learning training technique to train the neural networks, e.g., a gradient descent with backpropagation training technique that uses a conventional optimizer, e.g., stochastic gradient descent, Adam, or AdamW optimizer, to optimize an objective function that is appropriate for the task, e.g., object detection task, object classification task, point cloud segmentation task, or motion detection task, that the neural networks are configured to perform. Each training input can for example include a temporal sequence of point clouds.

During training, the system can incorporate any number of techniques to improve the speed, the effectiveness, or both of the training process. For example, when training the neural networks on an object detection task, the system can use an objective function that evaluates not only (i) a difference between the predicted locations (or shapes or both) of the 3-D bounding boxes generated by the output neural network and ground truth locations (or shapes or both) of the 3-D bounding boxes, but also (ii) a difference between the estimated object-center heatmap and a ground truth object-center heatmap, (iii) a difference between the estimated foreground segmentation and a ground truth foreground segmentation, or both (ii) and (iii). In this example, the estimated object-center heatmap, the estimated foreground segmentation, or both can be generated from the outputs of one or more intermediate layers of one of the neural networks.

As another example, prior to providing a training input to the neural networks, the system can drop a random subset of the point clouds from the temporal sequence of point clouds technique, and correspondingly process only the remaining point clouds in the temporal sequence using the neural networks to generate a training output. This training randomness improves the robustness of the neural networks when processing long length point cloud sequences.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a sequence of point clouds that correspond to multiple time steps; and
   processing the sequence of point cloud data to generate an output that characterizes the scene at a current time step in the multiple time steps, wherein the processing comprises:
   receiving a historical late-stage feature representation of a point cloud corresponding to a preceding time step that precedes the current time step;
   generating a current early-stage feature representation of a point cloud corresponding to the current time step; and
   processing the current early-stage feature representation and the historical late-stage feature representation to generate the output for the current time step.

2. The method of claim 1, wherein generating the current early-stage feature representation comprises:
   assigning each three-dimensional point in the point cloud to a respective voxel in a set of voxels for the early-stage feature representation; and
   for each voxel for the current early-stage feature representation, processing the three-dimensional points assigned to the voxel to generate a respective feature representation of the three-dimensional points assigned to the voxel.

3. The method of claim 1, wherein the historical late-stage feature representation is a late-stage feature representation generated by a backbone neural network at the preceding time step.

4. The method of claim 3, wherein the backbone neural network comprises one or more window-based attention blocks that each apply an attention mechanism to each of multiple subsets of the late-stage feature representation.

5. The method of claim 3, wherein the backbone neural network comprises a foreground segmentation layer that generates the late-stage feature representation at the preceding time step by removing feature representations that have been generated for background three-dimensional points.

6. The method of claim 1, wherein the output is an object detection output that identifies objects that are located in the scene.

7. The method of claim 1, wherein the output is a motion detection output that specifies any of a velocity, acceleration, heading, or trajectory corresponding to each of the objects that are located in the scene.

8. A system comprising one or more computers and one or more storage devices storing instructions that when executed by the one or more computers cause the one or more computers to implement:
   a voxel neural network configured to, at a current time step in a plurality of time steps:
      receive a current point cloud corresponding to the current time step; and
      process the current point cloud to generate a current early-stage feature representation of the current point cloud,
   a fusion subsystem configured to, at the current time step:
      receive the current early-stage feature representation of the current point cloud;
      receive a historical late-stage feature representation of a historical point cloud corresponding to a preceding time step that precedes the current time step; and
      process the current early-stage feature representation and the historical late-stage feature representation to generate a current fused feature representation at the current time step;
   a backbone neural network configured to, at the current time step:
      receive the current fused feature representation at the current time step; and
      process the current fused feature representation to generate a current late-stage feature representation at the current time step, and
   an output neural network configured to, at the current time:
      receive the current late-stage feature representation at the current time step; and
      process the current late-stage feature representation to generate an output that characterizes a scene at the current time step.

9. The system of claim 8, wherein the voxel neural network is configured to generate the current early-stage feature representation by:
   assigning each three-dimensional point in the current point cloud to a respective voxel in a set of voxels for the current early-stage feature representation; and
   for each voxel for the current early-stage feature representation, processing the three-dimensional points assigned to the voxel to generate a respective feature representation of the three-dimensional points assigned to the voxel.

10. The system of claim 8, wherein the fusion subsystem is configured to:
   compute an inverse of a spatial transformation matrix defining a mapping between a coordinate space of a LiDAR sensor at the preceding time step and a predetermined coordinate space of the scene at the preceding time step;
   transform the historical late-stage voxel feature representation by using the inverse of the spatial transformation matrix to generate an inversely calibrated historical late-stage feature representation; and
   determining a combination of the inversely calibrated historical late-stage feature representation and the current early-stage feature representation to generate a current aligned feature representation at the current time step.

11. The system of claim 8, wherein the fusion subsystem is further configured to:
   receive a sinusoidal time step offset encoding; and
   process the current early-stage voxel feature representation, the historical late-stage voxel feature representation, and the sinusoidal time step offset encoding to generate the current fused feature representation at the current time step.

12. The system of claim 8, wherein the historical late-stage feature representation is a late-stage feature representation generated by the backbone neural network at the preceding time step.

13. The system of claim 8, wherein the backbone neural network comprises a foreground segmentation layer that generates the current late-stage feature representation at the current time step by removing feature representations that have been generated for background three-dimensional points.

14. A system comprising one or more computers and one or more storage devices storing instructions that when executed by the one or more computers cause the one or more computers to perform operations comprising:
   receiving a sequence of point clouds that correspond to multiple time steps; and
   processing the sequence of point cloud data to generate an output that characterizes the scene at a current time step in the multiple time steps, wherein the processing comprises:
      receiving a historical late-stage feature representation of a point cloud corresponding to a preceding time step that precedes the current time step;
      generating a current early-stage feature representation of a point cloud corresponding to the current time step; and
      processing the current early-stage feature representation and the historical late-stage feature representation to generate the output for the current time step.

15. The system of claim 14, wherein generating the current early-stage feature representation comprises:
   assigning each three-dimensional point in the point cloud to a respective voxel in a set of voxels for the early-stage feature representation; and
   for each voxel for the current early-stage feature representation, processing the three-dimensional points assigned to the voxel to generate a respective feature representation of the three-dimensional points assigned to the voxel.

16. The system of claim 14, wherein the historical late-stage feature representation is a late-stage feature representation generated by a backbone neural network at the preceding time step.

17. The system of claim 16, wherein the backbone neural network comprises one or more window-based attention blocks that each apply an attention mechanism to each of multiple subsets of the late-stage feature representation.

18. The system of claim 16, wherein the backbone neural network comprises a foreground segmentation layer that generates the late-stage feature representation at the preceding time step by removing feature representations that have been generated for background three-dimensional points.

19. The system of claim 14, wherein the output is an object detection output that identifies objects that are located in the scene.

20. The system of claim 14, wherein the output is a motion detection output that specifies any of a velocity, acceleration, heading, or trajectory corresponding to each of the objects that are located in the scene.

* * * * *